May 18, 1937. E. A. RUDONI 2,080,546
INDEPENDENT WHEEL SUSPENSION
Filed July 18, 1935
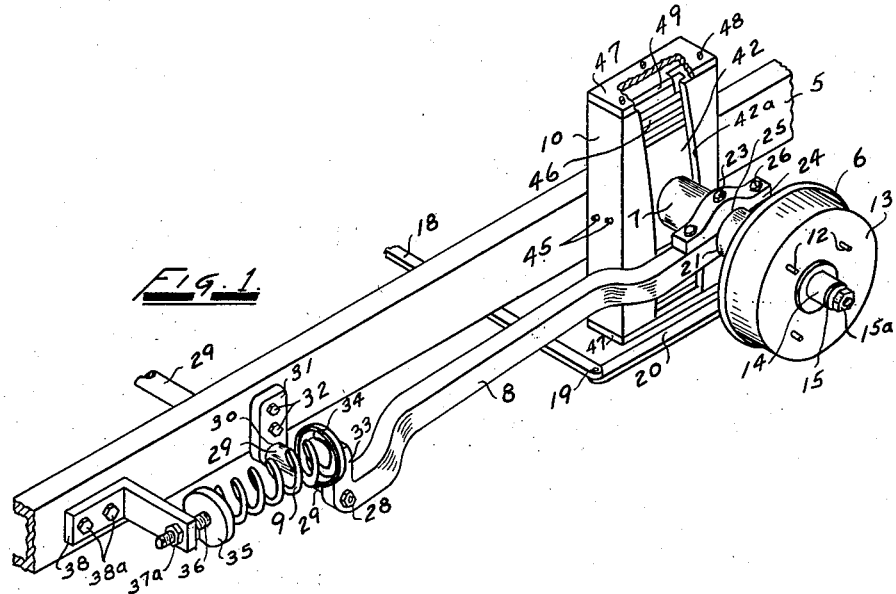
Fig. 1
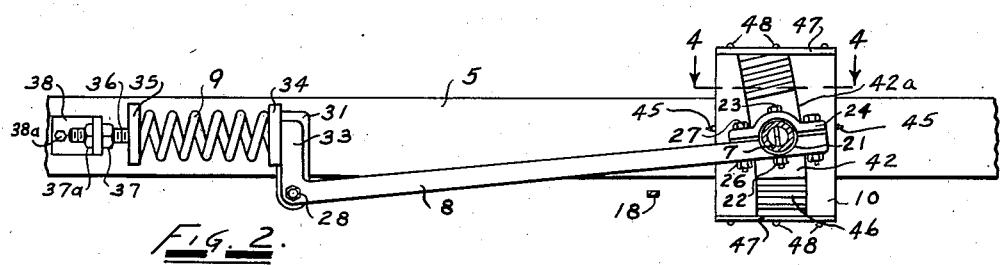
Fig. 2
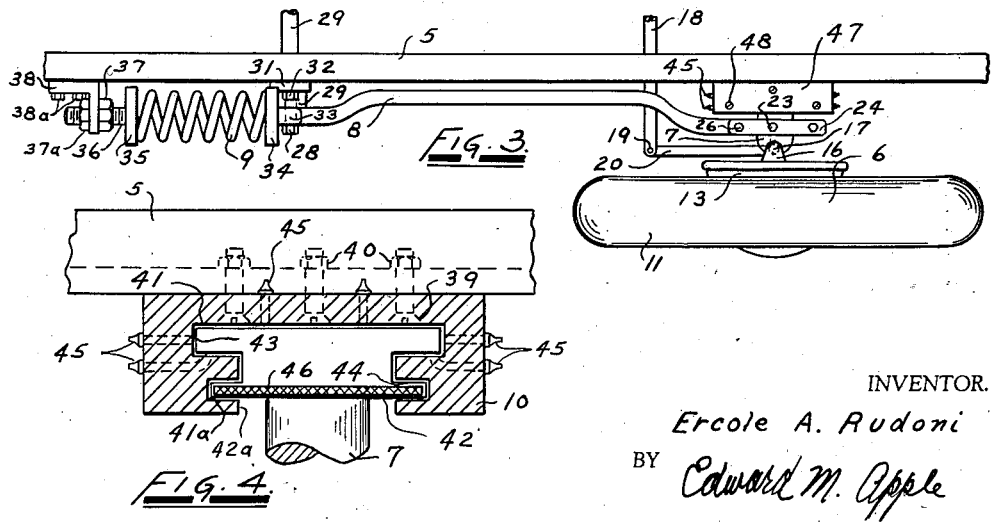
Fig. 3
Fig. 4
INVENTOR.
Ercole A. Rudoni
BY Edward M. Apple
ATTORNEY.

Patented May 18, 1937

2,080,546

UNITED STATES PATENT OFFICE 2,080,546

INDEPENDENT WHEEL SUSPENSION

Ercole A. Rudoni, Lincoln Park, Mich.

Application July 18, 1935, Serial No. 32,083

2 Claims. (Cl. 267—20)

This invention relates to wheel suspensions for vehicles, and more particularly to a means for independently suspending and springing the wheels of automobiles, trucks, buses, and other vehicles.

An object of the invention is the provision of a device which is sturdy, simple in construction, inexpensive to manufacture and assemble, and one which will support the vehicle in a stable manner, yet provide maximum comfort for the occupants.

A further object of the invention is the provision of a device which will suspend each wheel independently of the others, thereby preventing road shocks from being transmitted from one wheel to another and to the frame of the vehicle.

A still further object of the invention is the provision of means for guiding the travel of independently suspended wheels in a vertical plane, thereby maintaining a constant camber angle.

Other objects and advantages of the invention will appear as the description proceeds.

In the accompanying drawing, which constitutes a part of my disclosure, I have fully and clearly illustrated a preferred embodiment of my invention, in which drawing:

Fig. 1 is a perspective view of a device embodying my invention, with parts broken away and with the wheel removed, and illustrates the means of suspending the front wheels of a vehicle from the frame of said vehicle.

Fig. 2 is a side elevation of the device in position on the frame, with the axle broken away and the wheel assembly removed.

Fig. 3 is a plan view of the device.

Fig. 4 is a section, with parts broken away, taken on line 4—4 of Fig. 2.

Referring now more particularly to the drawing, it will be seen that in the embodiment herein disclosed, the device is mounted on the longitudinal frame member 5 of the vehicle, and comprises the conventional front wheel assembly 6 (Fig. 3), the stub axle member 7, the torque arm 8, the helical coil spring 9, and the guide member 10.

The front wheel assembly 6 (Figs. 1 and 3) consists of the wheel 11 (Fig. 3) which is secured, by means of the studs 12 (Fig. 1), to the brake drum 13, the latter being arranged to rotate upon bearings (not shown) in the wheel hub 14, which is provided with the washer 15 and the nut 15a to prevent the drum 13 from being disengaged from the hub. To permit the front wheel to turn, I provide a steering spindle 16 (Fig. 3), which is secured by any suitable means to the wheel hub 14, and which swings about the kingpin 17, the latter being formed on the outer end of the stub axle 7. The wheel 11 is turned by means of a standard steering mechanism (not shown) which operates the steering tie rod 18 which is pivotally secured by means of the pin 19 to the arm 20, the latter being rigidly fastened to the steering spindle 16. In order to make the device rigid and strong, I prefer to make the stub axle 7 of tubular shape and as short as possible, consistent with providing sufficient clearance to permit the wheel 11 to turn through its predetermined maximum angle.

The wheel assembly 6 is supported by means of the torque arm 8, which is formed at one end with a transverse groove 21 (Fig. 3) on its upper surface adapted to receive the axle member 7, and is secured thereto by the nut 22, the bolt 23, and the bracket 24, the latter being in turn bolted to the torque arm 8 by means of the nuts 26 and the bolts 27. The torque arm 8 is secured to the axle member 7 as near as possible to the outer end of the axle for greater rigidity, and is bent or formed into any suitable shape so that it will not interfere with the turning of the wheel 11. The other end of the torque arm 8 is secured, by means of the nut 28, to the transverse rod 29, which is arranged to rotate in the bearing hole 30 (Fig. 1), formed in the bracket 31, the latter being secured to the side of the longitudinal frame member 5 by the bolts 32. In order to provide a firm support for the torque arm 8, I prefer to extend the transverse rod 29 the full width of the frame of the vehicle.

The torque arm 8 (Fig. 2) is provided with an extension member 33 to the end of which is secured, by welding or other suitable means, the socket 34, which provides a support for one end of the helical coil spring 9, the latter being secured therein by any suitable means. The other end of the spring 9 is secured by any suitable means, in the socket 35, which is secured by any suitable means to the bolt 36, which is attached by means of the adjusting nut 37 and the locking nut 37a to the bracket 38, the latter being secured to the frame member 5 by the bolts 38a.

The amount of compression in the coil spring 9 can be adjusted for varying conditions by means of the aforesaid adjusting nut 37, which may be turned with a standard wrench in order to shift the position of the socket 35, which supports one end of the spring 9, into a position which places the required stress in the spring, in which position it is locked by means of the locking nut 37a. The spring 9, which is preferably a helical coil spring, but which may be of any other suitable type or construction, is held in compression by the weight of the vehicle, the stress being transmitted from the axle 8 to the aforesaid spring 9 by means of the torque arm 8, which acts as a lever with the transverse rod 29 serving as its fulcrum. Road shocks are similarly transmitted to the spring 9, causing varying stresses which are absorbed by the spring.

In order to prevent the axle 7 from being laterally displaced and to maintain the wheel at a constant camber angle, I provide the vertical guide housing 10, which is secured to the outer side of the longitudinal frame member 5 by means of the countersunk bolts 39 and nuts 40 (Fig. 4), and which is formed with the channels or grooves 41 and 41a, which provide guides and bearing surfaces for the guide block 42, the latter being secured to the axle 7 by welding or any suitable means. It is also contemplated to make the guide block 42 and the axle member 7 integral for the sake of strength and economy. It is understood that the guide housing 10 and the slidable guide block 42 may be made in a variety of different constructions, one of which is hereinafter described.

As shown in Figs. 1 and 2 the guide housing 10 is of substantially rectangular shape in its outer dimensions, and is formed with a curved opening 42a on its outer face to accommodate the slidable member 42 which travels in a vertical plane in an arc about the transverse pivot rod 29. The channels 41 and 41a (Fig. 4) are machined in the curved opening in the guide housing 10, and are adapted to engage the projecting ribs 43 and 44 of the slidable guide block 42. The channels 41 in the guide member 10 and the ribs 43 of the block 42 are designed to carry the stresses produced by their relative motion and by the cantilever action of the axle member 7, and are lubricated by means of the grease attachments 45 to minimize the wear caused by the friction of the moving parts and to facilitate their movement; whereas the channels 41a in the guide member 10 and the ribs 44 of the member 42 are designed to act as a seal against the entrance of dirt into the mechanism and the loss of lubricant therefrom. In order to provide for the travel of the slidable member 42 in the guide member 10 caused by road shocks or varying loads on the vehicle, I extend the guide member 10 above and below the ends of the member 42, a predetermined distance; and to seal the resulting openings for the aforementioned purposes, I equip the device with the expanding members 46 which are preferably made similar to a "bellows" of a heavy fabric or other suitable material, and which are arranged to fit snugly in the channels 41a in the guide member 10 (Fig. 4). The members 46 are secured by any suitable means to the slidable member 42 and to the cover plates 47 (Figs. 1 and 2), the latter being fastened to the top and bottom of the guide member 10 by the machine screws 48, and are alternately compressed and expanded as the slidable member 42 reciprocates in the guide 10, thereby providing a continuous seal for the guide 10. Sufficient lubricant from the fittings 45 will find its way into the channels 41a in the guide 10 to properly lubricate the ribs 44 and the expanding members 46 which travel therein.

In order to cushion the shock caused when the slidable member 42 travels the entire length of the guide 10 due to severe road shocks or to a broken spring, I provide the stops 49 (Fig. 1), which are preferably made of rubber or any suitable flexible material, and which are positioned at the upper and lower extremities of the channels 41 in the guide member 10, being secured therein to the cover plates 47 by any suitable means. If desired, small coil springs may be used in place of the stops 49.

Although I have herein disclosed a certain embodiment of the invention, it will be understood that various modifications may be employed, without violating the spirit of the invention, all of which are intended to be within the scope of the appended claims.

Having described my invention, what I claim and desire to secure by Letters Patent is:

1. The combination with a vehicle frame including a torque arm movably secured thereto, of a substantially rectangular guide housing secured broadside to said frame, an arcuate opening in said guide housing, a guide block arranged to travel in said opening, means to enclose said opening, and a stub axle secured to said guide block and to said torque arm.

2. A wheel suspension for a vehicle comprising the combination of a substantially rectangular guide housing secured to the frame of the vehicle, an arcuate opening on one side of said housing, offset grooves in said opening, a guide block having offset members arranged to travel in said grooves, a wheel spindle secured to said guide block, and a bell crank lever having arms of unequal length pivoted at the juncture of its arms to said frame, the longer arm of said lever being secured to said wheel spindle and the shorter arm of said lever being arranged to engage a spring adjustably mounted on said frame.

ERCOLE A. RUDONI.